United States Patent

[11] 3,598,084

[72] Inventors James Y. Whittier
South Glastonbury, Conn.;
Roy Fanti, Springfield, Mass.; Asaph U.
Merriam, East Hartford, Conn.
[21] Appl. No. 881,568
[22] Filed Dec. 2, 1969
[45] Patented Aug. 10, 1971
[73] Assignee United Aircraft Corporation
East Hartford, Conn.
Continuation-in-part of application Ser. No.
549,428, May 6, 1966, now abandoned.

[54] VAPOR DEPOSITION CHAMBER INCLUDING
SEALING AND HEATING MEANS
5 Claims, 1 Drawing Fig.
[52] U.S. Cl. ..................................................... 118/49.5,
219/155, 277/135
[51] Int. Cl. ............................................................ C23c 13/12
[50] Field of Search........................................... 118/47-
—49.5, 620; 277/135; 219/155; 263/3;
117/106—107.2

[56] References Cited
UNITED STATES PATENTS
1,144,595  6/1915  Henderson ................... 118/405 X

| 1,551,751 | 9/1925 | Kozak .......................... | 118/125 |
| 2,679,823 | 6/1954 | Denham ....................... | 118/405 |
| 2,910,383 | 10/1959 | Miller et al. .................. | 118/125 X |
| 3,130,073 | 4/1964 | Van de Linden et al....... | 118/47 X |
| Re.19,758 | 11/1935 | Underwood................... | 118/125 X |

Primary Examiner—Morris Kaplan
Attorney—Morgan, Finnegan, Durham and Pine

ABSTRACT: There are provided an apparatus, closure means therefore, for continuously effecting the pyrolytic deposition of boron on an electrically conductive substrate. The apparatus comprises a vertical tubular reactor chamber, novel closure means on both the top end and bottom end of the chamber which operate by capillary principle to retain an electrically conductive fluid serving as both a seal and an electrical contact for heating purposes and which include passageways for cooling and reactant gases, inlet means for feeding cooling and reactant gases into the reactor through said closure means, and outlet means for exiting excess cooling and reactant gases and byproduct gases from said chamber.

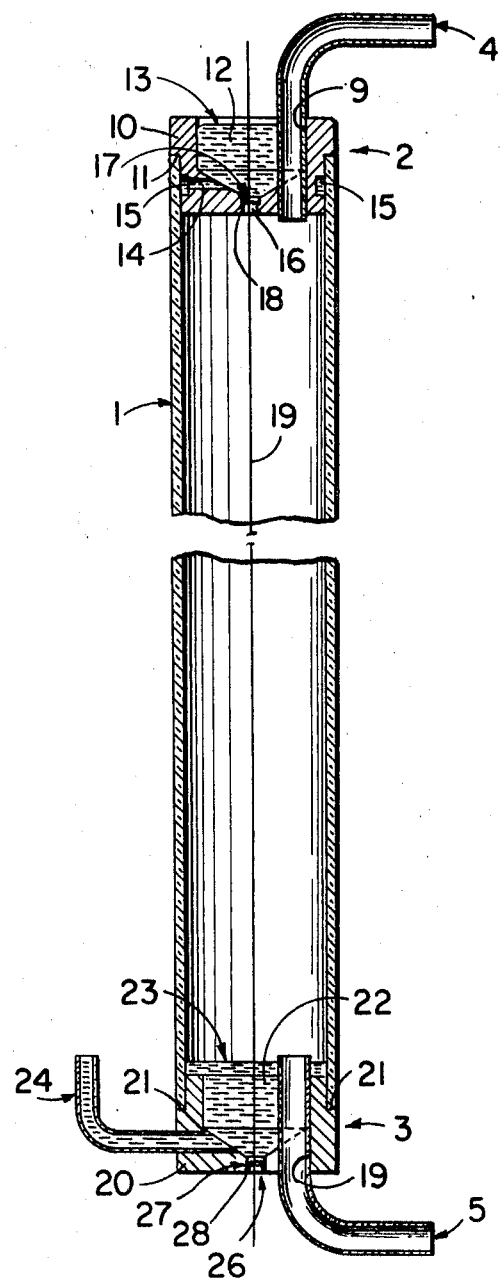

VAPOR DEPOSITION CHAMBER INCLUDING SEALING AND HEATING MEANS

This application is a continuation-in-part of copending application Ser. No. 549,428, filed May 6, 1966 and now abandoned.

This invention relates to a novel apparatus, closure means therefore and method for producing boron filaments in a continuous manner.

Background of the Invention

The pyrolytic deposition of boron on a filament by the thermal decomposition of a boron halide at elevated temperatures in a reducing atmosphere is well known. A typical known process of the aforementioned type is the production of boron by reacting boron trichloride and hydrogen by passing the reactants over an electrically heated tungsten filament, the reaction being represented by the following:

$$2BCl_3 + 3H_2 = 2B + 6HCl.$$

In the heretofore used reactors for carrying out the continuous, pyrolytic deposition of boron on an electrically conducting filament substrate, the reactors for the most part have required very special end fittings and tilting of the reactor in order to provide continuous operation. One of the chief drawbacks in using a horizontal, tilted or vertical reactor of the aforementioned type, is the wear problem created by the hard filament bearing against and slotting stainless steel end fittings. Also, such reactors required considerable space which from a cost point of view is undesirable.

Several serious problems are inherent in horizontal reactors. The hot wires tend to droop between their points of support. The supports must be kept too close together for reasonably efficient continuous operation at useful feed rates. The reactor end seals wear very rapidly. Arcing and wire breakage are frequent. Horizontal reactors, e.g., those shown in U.S. Pat. No. 3,365,330, are used primarily for nonconductive substrates.

Tilted reactors permit continuous operation but require considerable space. When mercury is used for the seals and electrodes difficult adjustments are needed to be sure that the coated filament does not touch the metal of the mercury seal before it enters the mercury pool. If this happens, the arcing will damage the filament.

One vertical reactor has been proposed for coating tantalum, molybdenum or tungsten with carbon. See Van der Linden et al., U.S. Pat. No. 3,130,073. The Van der Linden et al. apparatus may be useful for the stated purpose. But it is inherently of no use for the continuous coating of boron on filaments.

In the first place, the apparatus in the patent is designed to permit the heated wire to be drawn through the vessel so fast that a carbon coating of only 2 microns (0.000079 inch) is deposited. Thicker carbon coatings flake off when the wire is bent. Useful boron coatings, on the other hand, will be 12 to 24 times this thick (0.1 mil to 2 mils). Flaking off is no problem with boron at these thicknesses.

In the second place, mercury pools are used in the Van der Linden et al. apparatus to seal the reactor and provide electrical contact. The filament passes through glass tubes into and out of the pools. Because the glass tubes are not wetted by the mercury, they keep it from flowing away. Glass is satisfactory as a material to construct the ends of an apparatus for coating with materials as soft as deposited carbon. But boron coatings are so hard that they wear away stainless steel end fittings, so glass guides cannot be used in such a reactor for boron coating because they would be scored to pieces.

In the third place, the mercury pools in the Van der Linden et al. apparatus will vaporize at filament heating temperatures used to coat substrates with boron, preferably 1100° C.—1350° C., at the filament residence times needed. To coat filaments with carbon both the residence time and the heating time must be very short or else the thickness will exceed 2 microns. Under such conditions the mercury in the Van der Linden et al. reactor will not vaporize fast enough to break the seal and the electrical contact too soon. Furthermore, the concentration of mercury in the atmosphere may be low enough so as not to cause toxicity problems. On the other hand, useful boron coated substrates cannot be made in the Van der Linden et al. apparatus because the mercury will vaporize at the higher temperature and longer residence times. Atmospheric mercury concentration also will be increased.

The present invention overcomes the disadvantages noted in the prior art horizontal and tilted apparatus. Moreover, the advantages of a vertical apparatus, without the inherent inutility for boron deposition in the Van der Linden et al. apparatus, are provided by the novel reactor and end seal of the present invention.

An object of this invention is to provide an improved reactor for carrying out continuous, pyrolytic deposition of boron on a substrate.

A further object of this invention is to provide a reactor to carry out the continuous, pyrolytic deposition of boron on a substrate in a simple, efficient and economic manner and which reduces or eliminates the wear problem and arcing normally associated with the heretofore known reactors that required tilting thereof in order to provide a continuous operation.

A further object of this invention is to provide a reactor for the continuous, pyrolytic deposition of boron on a substrate which because of its simple construction affords considerable economy of space.

Another object of this invention is to provide an improved vertical reactor with liquid metal end seals for the continuous, pyrolytic deposition of boron on an electrically conductive substrate which eliminates the wear problem, vaporization of liquid sealant and atmospheric contamination seen with heretofore known vertical reactors.

Still another object of this invention is to provide an improved reactor seal incorporating a liquid sealant.

Description of the Invention

It has been found that the objects of this invention may be realized by pyrolytically depositing boron on an electrically conductive substrate by the employment of a vertical, straight-through reactor of the type now described.

In general, the vertical reactor of this invention comprises a vertical tubular reaction chamber; closure means at both the top end and bottom end of said chamber which operate by capillary principle to provide both a seal and electrical contact for heating purposes, inlet means communicating with a through-going passage for feeding cooling and reactant gases to the chamber through one of the closure means, and outlet means communicating with a through-going passage for exiting byproduct and excess cooling and reactant gases from the chamber through the other closure means.

The closure means at each end of the reactor includes a terminal plug or fitting member having a liquid compartment filled with a conductive fluid of high surface tension characteristics, e.g., mercury or a mercury-nickel amalgam, or the like, preferably mercury. Each liquid compartment terminates in an opening (e.g. an aperture, a slit, etc.) which is large enough to permit the continuous passage therethrough of a filament but is small enough to restrict passage therethrough of the conductive fluid contained in the liquid compartment. It is required that the closure have a through-going passage adjacent to the liquid compartment one wall of which is common to one wall of the compartment, to provide a heat exchanging effect. Of course, in top fitting members, in embodiments wherein the filament runs downwardly, the opening must be large enough to permit the passage of the uncoated filament substrate while in the bottom fitting member the opening must be large enough to permit continuous passage of the coated filament. If the filament is adapted to run upwardly, the same considerations as to opening sizing will obtain.

Description of the Drawing

In order to describe the invention more fully, reference is now made to the embodiment of the invention illustrated in the accompanying drawing. As shown in the drawing, there is provided a vertical tubular reaction chamber 1, in the form of a glass, e.g., Pyrex or quartz tube, a top closure member, designated generally by the reference numeral 2, a bottom closure member designated generally by the reference numeral 3, a gas tube 4 communicating with through-going passage 9 to provide for feeding or exiting gases through the top closure 2 member into or out of the reaction chamber 1, a gas tube 5 communicating with through-going passage 19 to provide for feeding and exiting gases through the bottom closure 3 into or out of the reaction chamber 1, and means for passing an electrical current through the substrate.

The top closure member 2 comprises a cup-shaped fitting member 10, in the form of a terminal plug having an annular seat 11 which rests against the top of the reaction chamber 1. The fitting member 10 has a liquid compartment 12 filled with mercury or other suitable liquid 13. The liquid 13 in compartment 12 serves both as a seal for the top of the reaction chamber 1, which is exposed to the air, and an electrode contact for an outside power supply (not shown) such, for example, as a voltage stabilized DC power supply.

The fitting member or top terminal plug 10 is provided with a port or fluid passageway 14 for passage of liquid, e.g., mercury from liquid compartment 12 to fill annular groove 15, located around the circumference of the plug. The liquid, e.g., mercury which passes through the passageway 14 and fills the annular compartment 15 serves as a seal in helping to maintain an airtight reaction chamber.

The liquid compartment 12 terminates in a central restrictive orifice 16 having, as herein preferably embodied, a centrally apertured jeweled disc 17 supported on annular shoulder portion 18. The aperture of jewel 17 is of such a dimension (e.g. 1 to 15 mils) that a metallic filament substrate (e.g. 0.5 mil diameter) 19 may pass therethrough in a continuous manner but is sufficiently small so as to restrict passage of liquid, e.g., mercury from liquid compartment 12.

One wall of the liquid compartment 12 is common to one wall of through-going passage 9. When cooling gases are passed through the passage in heat exchange relationship to the liquid metal, they function to keep the pool cool, prevent vaporization with resulting loss of electrical contact and, when mercury is the liquid, toxicity in adjacent areas is minimized.

The bottom closure member 3 comprises a cup-shaped fitting member 20, in the form of a terminal plug having an annular seat 21 on which rests the bottom of the reaction chamber 1. The fitting member 20 has a liquid compartment 22 overflowing with mercury or other suitable liquid 23, said liquid serving both as a seal for the bottom of the reaction chamber and an electrode contact for the outside power supply. The fitting or plug member 20 has inserted therein a liquid fill tube which serves as a passageway 24 for supplying or feeding liquid, e.g., mercury, to the liquid compartment 22.

The bottom liquid compartment 22, like the top liquid compartment 12 in this embodiment terminates in a central restrictive orifice 26 having a centrally apertured jeweled disc 27 supported on annular shoulder portion 28. The aperture of jewel 27 is of such a dimension (e.g. 1 to 15 mils) that the boron coated filament (e.g. 1 mil) may pass therethrough in a continuous manner but is sufficiently small so as to restrict passage of liquid, e.g., mercury, from liquid compartment 22. The same consideration of sizing will apply if the filament moves upwardly. As above, one wall of liquid compartment 22 is common to one wall of passage 19 to provide heat exchange.

The jeweled discs 17 and 27 may be made of any suitable material which is inert and heat resistant under the temperatures employed in effecting the pyrolytic deposition of boron on the filament substrate. Examples of suitable materials for this purpose are ruby, sapphire, stainless steel, etc.

The filament substrate 19 may be continuously passed through the reaction chamber either upwardly or downwardly by any suitable feeding means. For example, the filament may be taken off a storage spool by means of a motor-driven winding spool on which the coated filament is wound after it passes through the reaction chamber.

Of course, the rate at which the filament passes through the reactor governs the thickness of the boron coating. Thus, for example, a filament driven at a rate of 25'/hr. will have a greater coating buildup than a filament drawn at the rate of 5000'/hr. In general, the boron coatings will have a thickness in the range of 0.1 mil to several mils.

In utilizing the vertical reactor of the instant invention, the substrate filament is preferably heated by ohmic resistance heating. As will be readily apparent to those in the field, in effecting ohmic resistant heating of filament 19, current is caused to flow through wire 19 by means of the conductive fluid (preferably mercury) in liquid compartments 12 and 22, the conductive fluid in said compartments serving as electrode contacts for the passage of current supplied by an outside power supply. The current passing through a circuit comprising filament 19 and the electrode contacts causes the filament to be heated by ohmic resistance heating.

This invention in its broadest aspects contemplates a reactor seal for a vertically arranged reactor vessel wherein a vapor deposition is effected on a moving substrate. The seal comprises: a terminal fitting member forming an end closure for the vessel, the fitting having a vertically disposed through-going liquid compartment and passageway through which the substrate is adapted to be drawn, the liquid compartment and passageway terminating in a lower opening, the fitting including a through-going passage adjacent to said vertically disposed compartment and passageway, one wall of which is common to one wall of said compartment and passageway; inlet means communicating with the passage in the fitting for feeding cooling and reactant gases through the closure into the reactor; and a liquid sealant comprising an electrically conductive fluid of high surface tension characteristics contained and supported in the compartment by capillary principle and through which the substrate moves.

In any event, the lower opening will be wide enough to provide free passage of the substrate therethrough but narrow enough to retain the liquid sealant thereon.

A preferred seal is one wherein the lower opening, which can, for example, be an aperture, a slit orifice or a pivotal slitted orifice member, is formed to a width of 1 to 15 mils.

A properly sized lower opening will also prevent the filament from dragging liquid sealant, e.g., mercury, through the opening. It will also serve to prevent any reactant gas pressure in the reactor from blowing the liquid sealant out of the electrode. It will permit sufficient surface tension to support the required amount of liquid sealant allowing it to make electrical contact to the filament without causing arcing. A properly sized lower opening also will permit any perturbation in filament diameter to pass through without loss of liquid sealant, e.g., mercury.

This novel closure means provides a way to overcome all of the disadvantages due to hot spots in the prior art reactors, especially in the vertical reactor of Van der Linden et al., discussed above. It provides a means to cool the hot end of the wire where it meets the liquid metal pool and maintains the integrity of the pool and of the wire. The cooling is accomplished by passing a gas or gases having a high average coefficient of thermal conductivity through the closure in heat exchange relationship with the metal pool. In contrast, Van der Linden et al.'s closure does not provide for heat exchange, the gas being introduced into the body of the vessel through the reactor wall and not through the closure.

The cooling gas may be one of the reactant gases or a gas inert to the reactant gas. It may be introduced at either tube 4 or tube 5 depending on which is selected for inlet purposes.

When the reactant gases or vapors comprise a metal halide in combination with a reducing gas, such as hydrogen, and hydrogen passes through passage 9 or 19, the rate of heat dissipation from container 12 or 22 is increased substantially. Hydrogen because of its high coefficient of thermal conductivity is especially suitable as a temperature regulating, i.e., cooling gas.

As has been mentioned the new reactor seal is adapted for use in vertical vessels in which there is effected deposition on a moving substrate. In carrying out such a process, the chemical compound or compounds required to form the desired coating are supplied to the reaction chamber in vapor form, and may be admixed with other gases, e.g., inert gases, reducing gases, or the like, as required. In any event, the coating gas stream may conveniently be supplied in such a way that the vapors within the reaction chamber are in close proximity to the wire, filament, or the like undergoing coating.

Preferably, the filament or wire is conducted through a tube having a relatively small cross sectional area, so that the vapors are concentrated across and in intimate contact with the hot filament.

Among the coating compounds that may be used to deposit elements may be mentioned compounds of metals, such as platinum, tungsten, uranium, vanadium, tantalum, or metalloids, such as silicon, boron and the like; or carbon.

The chemical compounds used in depositing conducting elements will typically comprise halides, e.g., chlorides, fluorides, iodides, or bromides of the described metals or metalloids.

A reducing and cooling gas such as hydrogen will also ordinarily be included as part of the reactant gas or vapor mixture when halides of the metals or metalloids are employed.

Inert and cooling gases, such as helium, neon, argon, krypton, xenon, and the like may also be included, if desired.

Chemical compounds as distinguished from elements, which may be deposited, include electrically conducting nitrides, carbides, oxides, phosphides and sulfides of such elements as silicon, titanium, zirconium and the like. Typical of such compounds are titanium nitride, zerconium carbide, and the like.

When the described chemical compounds are to be deposited, vapors of phosphorous, sulfur, oxygen, carbon and the like, or compounds of such elements, will be included as part of the reactant gas stream. In gaseous form, these also provide a cooling effect.

For instance, when making a coating of zirconium carbide, using zirconium tetrachloride, a certain amount of a carbon containing gas, e.g., methane will be added to the reactant gas to produce a coating of zirconium carbide.

As a further example, in order to obtain a deposit of hafnium boride, a mixture of hafnium chloride, hydrogen and boron tribromide may be passed into the reaction zone. Hafnium boride will then be deposited on the moving filament with the formation of hydrogen chloride and hydrogen bromide.

Any suitable conducting wire or filament may be used as the substratum on which deposition occurs. Thus, the wires or filaments may be any of the metals or metalloids mentioned above, or carbon or even conductive glass, and the like. Typical substrate filaments may then be composed of tungsten, silicon, boron, platinum, uranium, vanadium, rhenium, tantalum, carbon conductive glass and the like.

Ordinary glass, metal or any other material may be used for the reaction chamber as the latter is only slightly heated during operation. In most cases, a simple glass cylinder provided with an inlet and an outlet for the reactant gases and cooling gases, as well as an opening for the wire or the like, which is to be coated, and the necessary electrical contacts, will be sufficient.

In carrying out the process for the pyrolytic deposition of boron in the reactor according to the process of this invention conditions conventionally used for effecting pyrolytic deposition of boron may be used. For example, the electrically conductive, e.g., tungsten, filament substrate may be heated by ohmic resistance heating to a temperature in the range of 700° C. to 1400° C., preferably 1100° C. to 1350° C. The reaction may be carried out at a pressure of one atmosphere. The reactant and cooling gases which are introduced into the reaction chamber 1 through the inlet tube 4 or 5, as the case may be, will be, for example, a boron containing gas (e.g., a boron halide, such as boron trichloride) in an amount of 15 to 50 mol percent and a reducing gas, preferably hydrogen, in an amount of 85 to 50 mol percent. A preferred ratio of gases is 40 mol percent boron trichloride and 60 mol percent hydrogen. Excess reactant gases, byproduct gases and cooling gases exit from the chamber through outlet tubes 4 or 5, as the case may be, the opposite tube being the inlet tube. In comparative testing, it was demonstrated that the mercury sealant would vaporize unless cooled by bringing the gases in through the closure as is shown in the drawing. Vaporizing mercury is detrimental to the reactor and will limit the run length by loss of electrical contact and ability to seal.

The invention in its broader aspects is not limited to the specific combinations and improvements described but departures may be made therefrom within the scope of the accompanying claims without departing from the principles of the invention and without sacrificing its chief advantages.

We claim:

1. A vertical reactor for use in effecting the pyrolytic deposition of boron on an electrically conductive substrate comprising:
   a. a vertical tubular reaction chamber;
   b. a closure means at both the top end and bottom end of said chamber which operate by capillary principle to provide both a seal and electrical contact for heating purposes each of which comprise a terminal fitting member having a liquid compartment containing a conductive fluid of high surface tension characteristics, said liquid compartment terminating in an opening which is large enough to permit the continuous passage therethrough of a filament but is small enough to restrict passage therethrough of the conductive fluid contained in the liquid compartment and having a through-going passage adjacent said compartment;
   c. an annular groove being defined between said top terminal fitting member and said reaction chamber, said annular groove communicating with said liquid compartment to maintain the conductive fluid in the groove and provide a seal between the fitting member and the reaction chamber;
   d. inlet means communicating with the passage in one of said closure means for feeding cooling and reactant gases through said closure means into said chamber;
   e. outlet means communicating with the passage in the other of said closure means for exiting byproduct and excess cooling and reactant gases from the chamber through said closure means; and
   f. means for passing an electrical current through said substrate.

2. A vertical reactor as defined in claim 1 wherein the conductive fluid is mercury.

3. A vertical reactor as defined in claim 1 wherein said opening comprises a centrally apertured jeweled disc, the aperture of said disc being of sufficient dimension to provide for the continuous passage therethrough of the filament but to restrict passage therethrough of the conductive fluid contained in the liquid compartment.

4. In a vertically arranged reactor vessel wherein a vapor deposition is effected on a moving substrate, a reactor seal comprising:
   a. a terminal fitting member forming an end closure for said vessel, the fitting having a vertically disposed through-going liquid compartment and passageway through which the substrate is adapted to be drawn, said liquid compartment and passageway terminating in a lower opening, the fitting including a through-going passage adjacent to said vertically disposed compartment and passageway;
   b. an annular groove being defined between said terminal fitting member and said reactor vessel, said annular groove communicating with said liquid compartment to maintain the conductive fluid in the groove and provide a seal between the fitting member of the vessel;
c. inlet means communicating with the passage in said fitting for feeding cooling and reactant gases through said closure means into said reactor; and
d. a liquid sealant comprising an electrically conductive fluid of high surface tension characteristics contained and supported in said compartment by capillary principle and through which the substrate moves.

5. A reactor as defined in claim 4 wherein said opening is formed to a width of 1 to 15 mils.

PO-1050
(5/69)

UNITED STATES PATENT OFFICE
CERTIFICATE OF CORRECTION

Patent No. 3,598,084　　　　　　　　Dated August 10, 1971

Inventor(s) James Y. Whittier et al

It is certified that error appears in the above-identified patent and that said Letters Patent are hereby corrected as shown below:

Claim 4, line 2, column 7　　　　Delete "of" and insert --and--

Signed and sealed this 11th day of January 1972.

(SEAL)
Attest:

EDWARD M. FLETCHER, JR.　　　　ROBERT GOTTSCHALK
Attesting Officer　　　　　　　　Acting Commissioner of Patents